United States Patent
Davis

(10) Patent No.: US 9,916,506 B1
(45) Date of Patent: Mar. 13, 2018

(54) INVISIBLE FIDUCIAL MARKERS ON A ROBOT TO VISUALIZE THE ROBOT IN AUGMENTED REALITY

(71) Applicant: X Development LLC, Mountain View, CA (US)

(72) Inventor: Benjamin Davis, Palo Alto, CA (US)

(73) Assignee: X Development LLC, Mountain View, CA (US)

(*) Notice: Subject to any disclaimer, the term of this patent is extended or adjusted under 35 U.S.C. 154(b) by 0 days.

(21) Appl. No.: 14/809,181

(22) Filed: Jul. 25, 2015

(51) Int. Cl.
G06K 9/00 (2006.01)
G02B 27/01 (2006.01)
G06T 7/00 (2017.01)
H04N 5/33 (2006.01)
G06T 19/00 (2011.01)

(52) U.S. Cl.
CPC ....... *G06K 9/00671* (2013.01); *G02B 27/017* (2013.01); *G06T 7/0002* (2013.01); *G06T 7/004* (2013.01); *G06T 19/006* (2013.01); *H04N 5/33* (2013.01); *G06T 2207/10048* (2013.01)

(58) Field of Classification Search
CPC ..... G02B 27/017; G06T 7/0002; G06T 7/004; G06T 19/006; H04N 5/33
See application file for complete search history.

(56) References Cited

U.S. PATENT DOCUMENTS

| | | |
|---|---|---|
| 4,853,771 A | 8/1989 | Witriol |
| 5,543,802 A | 8/1996 | Villevieille et al. |
| 7,231,063 B2 | 6/2007 | Naimark et al. |
| 7,353,082 B2 | 4/2008 | Pretlove et al. |
| 7,539,557 B2 | 5/2009 | Yamauchi |
| 7,714,895 B2 | 5/2010 | Pretlove et al. |

(Continued)

FOREIGN PATENT DOCUMENTS

| | | |
|---|---|---|
| EP | 1435280 | 8/2008 |
| WO | 03/045640 | 6/2003 |
| WO | 2006/043873 | 4/2006 |

OTHER PUBLICATIONS

Wang, Tianren, Yue Liu, and Yongtian Wang. "Infrared marker based augmented reality system for equipment maintenance." Computer Science and Software Engineering, 2008 International Conference on. vol. 5. IEEE, 2008.*
Siyu, E. "Evaluation of Visible and Invisible Fiducial Markers for Clothing Tracking." (2012).*
Park, Hanhoon, and Jong-II Park. "Invisible marker based augmented reality system." Visual Communications and Image Processing 2005. International Society for Optics and Photonics, 2005.*
Faessler et al., "A Monocular Pose Estimate System based on Infrared LEDs," 2014 IEEE International Conference on Robotics and Automation (ICRA), IEEE, 2014, pp. 907-913.
Siyu E, "Evaluation of Visible and Invisible Fiducial Markers for Clothing Tracking," Technical Report No. UCB/EECS-2012-153, Electrical Engineering and Computer Sciences, University of California at Berkeley, Jun. 1, 2012, 21 pages.

(Continued)

*Primary Examiner* — Nirav G Patel
(74) *Attorney, Agent, or Firm* — McDonnell Boehnen Hulbert & Berghoff LLP

(57) ABSTRACT

An example system includes a robotic device, at least one invisible fiducial marker on the robotic device that is detectable within a particular band of invisible light, a camera that is configured to detect the particular band of invisible light, and a control system. The control system may be configured to receive an image of the robotic device within an environment, identify at least one position within the image of the at least one invisible fiducial marker on the robotic device, determine a position of the robotic device relative to the camera, determine one or more positions within the image to overlay one or more virtual annotations, and provide for display of the image of the robotic device within the environment with the one or more virtual annotations overlaid at the one or more determined positions within the image.

17 Claims, 13 Drawing Sheets

(56) References Cited

U.S. PATENT DOCUMENTS

| | | |
|---|---|---|
| 7,908,040 B2 | 3/2011 | Howard et al. |
| 7,974,738 B2 | 7/2011 | Bruemmer et al. |
| 8,225,226 B2 | 7/2012 | Skourup et al. |
| 8,340,820 B2 | 12/2012 | Nair |
| 8,386,078 B1 | 2/2013 | Hickman et al. |
| 8,406,926 B1 | 3/2013 | Lewis |
| 8,594,845 B1 | 11/2013 | Gharpure |
| 8,731,276 B2 | 5/2014 | Mizutani et al. |
| 8,874,261 B2 | 10/2014 | Hein et al. |
| 2002/0161477 A1 | 10/2002 | Doi |
| 2004/0189631 A1 | 9/2004 | Kazi |
| 2005/0227724 A1 | 10/2005 | Tsai |
| 2007/0208442 A1 | 9/2007 | Perrone |
| 2011/0311127 A1 | 12/2011 | Mizutani |
| 2013/0073089 A1 | 3/2013 | Nakahara |
| 2013/0117377 A1 | 5/2013 | Miller |
| 2013/0218340 A1 | 8/2013 | Hager et al. |
| 2013/0226344 A1 | 8/2013 | Wong et al. |
| 2013/0278631 A1 | 10/2013 | Border et al. |
| 2013/0300637 A1 | 11/2013 | Smits et al. |
| 2013/0346348 A1 | 12/2013 | Buehler et al. |
| 2014/0058407 A1 | 2/2014 | Tsekos et al. |
| 2014/0129942 A1 | 5/2014 | Rathod |
| 2014/0316570 A1 | 10/2014 | Sun et al. |
| 2014/0336818 A1 | 11/2014 | Posselius |

OTHER PUBLICATIONS

Wang et al., "Infrared Marker based Augmented Reality System for Equipment Maintenance," 2008 International Conference on Computer Science and Software Engineering, IEEE, pp. 816-819.

Kobayashi et al., "Viewing and reviewing how humanoids sensed, planned and behaved with mixed reality technology", Humanoid Robotics, 2007 7th IEEE-RAS International Conference, IEEE, Nov. 29, 2007, pp. 130-135.

Chestnutt et al., "Interactive control of humanoid navigation", The 2009 IEEE/RSJ International Conference on Intelligent Robots and Systems, Oct. 10, 2009, pp. 3519-3524.

Stilman et al., "Augmented reality for robot development and experimentation", Technical Report CMU-RI-TR-05-55, Nov. 30, 2005, pp. 1-11.

M.F. Zaeh, et al., Interactive Laser-Projection for Programming Industrial Robots, Technical University Munich Institute for Machine Tools; Garching, Germany, pp. 125-128.

\* cited by examiner

INVISIBLE FIDUCIAL MARKERS ON A ROBOT TO VISUALIZE THE ROBOT IN AUGMENTED REALITY

BACKGROUND

Robotic systems may be used for applications involving material handling, welding, assembly, and dispensing, among others. Over time, the manner in which these robotic systems operate is becoming more intelligent, more efficient, and more intuitive. As robotic systems become increasingly prevalent in numerous aspects of modern life, the need for robotic systems that can operate alongside and interface with humans becomes apparent. Therefore, a demand for such robotic systems has helped open up a field of innovation in actuators, sensing techniques, controllers, as well as component design and assembly.

SUMMARY

Example systems and methods may allow for use of invisible fiducial markers on a robot to display an augmented reality presentation. An image of a robot may be captured using a camera, such as a camera on a head-mounted display. The camera may include a filter that passes a certain band of invisible (e.g., infrared) light. The robot may have invisible fiducial markers positioned at one or more points which are made from a material (e.g., infrared-visible ink) that is visible by the camera. Data from the camera may be used to locate the invisible fiducial markers within an image of the robot. The position of the robot relative to the camera may then be determined. One or more virtual annotations may then be overlaid on an image of the robot as part of an augmented reality presentation.

In one aspect, a system is provided. The system includes a robotic device. The system also includes at least one invisible fiducial marker on the robotic device, where the at least one invisible fiducial marker is detectable within a particular band of invisible light. The system further includes a camera that is configured to detect the particular band of invisible light. The system additionally includes a control system. The control system may be configured to receive, from the camera, an image of the robotic device within an environment. The control system may be further configured to identify at least one position within the image of the at least one invisible fiducial marker on the robotic device. Based on the at least one position within the image of the at least one invisible fiducial marker on the robotic device, the control system may additionally be configured to determine a position of the robotic device relative to the camera. Based on the position of the robotic device relative to the camera, the control system may also be configured to determine one or more positions within the image to overlay one or more virtual annotations. The control system may be further configured to provide for display of the image of the robotic device within the environment with the one or more virtual annotations overlaid at the one or more determined positions within the image.

In another aspect, a method is provided that includes receiving, from a camera that is configured to detect a particular band of invisible light, an image of a robotic device within an environment. The method further includes identifying at least one position within the image of at least one invisible fiducial marker on the robotic device, where the at least one invisible fiducial marker is detectable within the particular band of invisible light. Based on the at least one position within the image of the at least one invisible fiducial marker on the robotic device, the method additionally includes determining a position of the robotic device relative to the camera. Based on the position of the robotic device relative to the camera, the method further includes determining one or more positions within the image to overlay one or more virtual annotations. The method also includes providing for display of the image of the robotic device within the environment with the one or more virtual annotations overlaid at the one or more determined positions within the image.

In yet another aspect, a non-transitory computer-readable medium is provided having stored therein instructions, that when executed by a computing system, cause the computing system to perform functions. The functions include receiving, from a camera that is configured to detect a particular band of invisible light, an image of a robotic device within an environment. The functions further include identifying at least one position within the image of at least one invisible fiducial marker on the robotic device, where the at least one invisible fiducial marker is detectable within the particular band of invisible light. Based on the at least one position within the image of the at least one invisible fiducial marker on the robotic device, the functions additionally include determining a position of the robotic device relative to the camera. Based on the position of the robotic device relative to the camera, the functions further include determining one or more positions within the image to overlay one or more virtual annotations. The functions also include providing for display of the image of the robotic device within the environment with the one or more virtual annotations overlaid at the one or more determined positions within the image.

In yet another aspect, another system is provided. The system includes means for receiving, from a camera that is configured to detect a particular band of invisible light, an image of a robotic device within an environment. The system further includes means for identifying at least one position within the image of at least one invisible fiducial marker on the robotic device, where the at least one invisible fiducial marker is detectable within the particular band of invisible light. Based on the at least one position within the image of the at least one invisible fiducial marker on the robotic device, the system additionally includes means for determining a position of the robotic device relative to the camera. Based on the position of the robotic device relative to the camera, the system further includes means for determining one or more positions within the image to overlay one or more virtual annotations. The system also includes means for providing for display of the image of the robotic device within the environment with the one or more virtual annotations overlaid at the one or more determined positions within the image.

These as well as other aspects, advantages, and alternatives will become apparent to those of ordinary skill in the art by reading the following detailed description, with reference where appropriate to the accompanying drawings.

DETAILED DESCRIPTION

Figure 1:
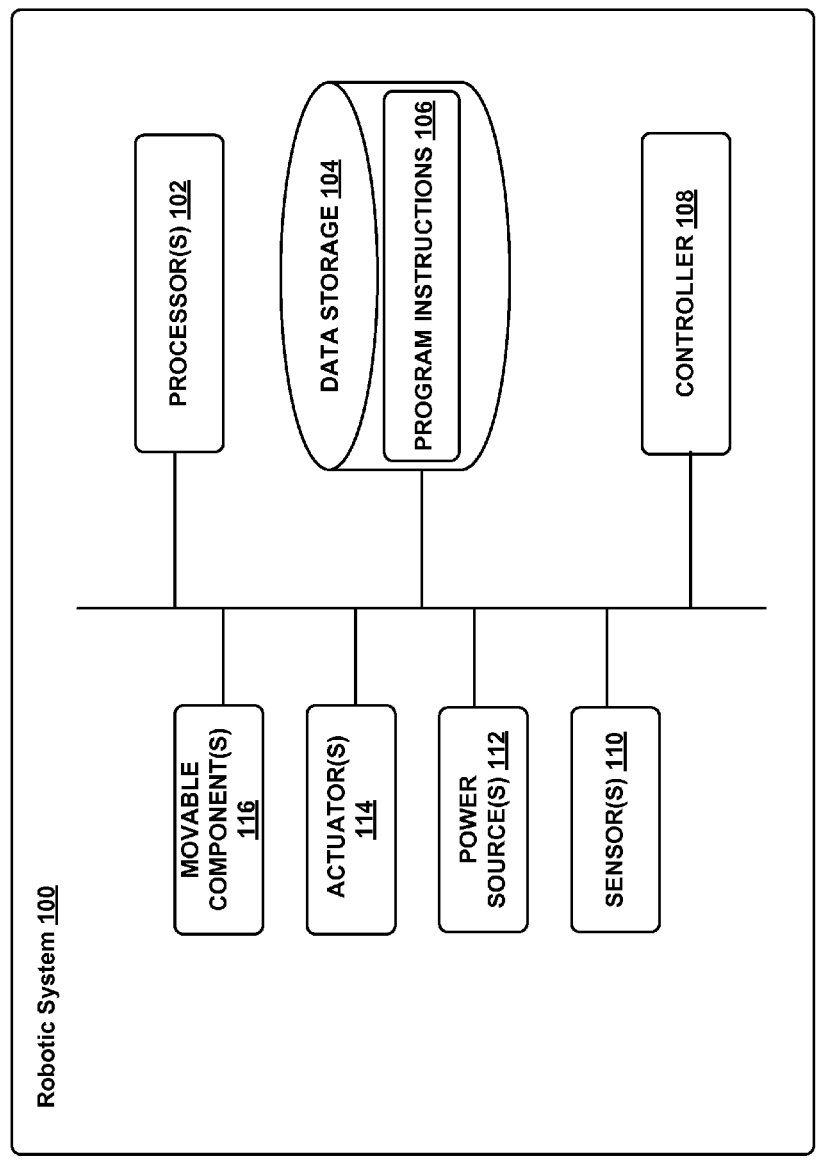
FIG. 1 illustrates an example configuration of a robotic system, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

Augmented reality may be used with robotics to provide a visual image of a robot with certain useful information virtually overlaid on a display. For instance, a tablet computer or a head-mounted device ("HMD") with a camera directed at a robot may be used to show an augmented reality presentation that includes a live video feed of the robot. An advantage of using augmented reality instead of an entirely virtual 3D model (e.g., a computer-aided design or "CAD" model) is that a virtual 3D model may not always have an accurate representation of the current configuration of a robot's operating environment (also referred to as a "workcell").

In order to determine where to overlay one or more virtual annotations on an image of the robot, the position of the robot relative to the camera may be determined. Estimating this position by processing an image of the robot directly may be inaccurate or computationally expensive. To facilitate determining a position of the robot relative to the camera, one or more fiducial markers may be positioned on the robot at predetermined locations. These fiducial markers within an image of the robot may then be identified and used to determine where the robot is within an environment relative to the camera. Such fiducial markers may be visually distracting to a user. Example systems and methods use one or more invisible fiducial markers positioned on a robot at known locations in order to help register the robot with the camera for an augmented reality presentation.

Within examples, a camera is provided that is sensitive to wavelengths of invisible light within a particular band of the invisible light spectrum. Fiducial markers made from a material that reflects, emits, and/or absorbs invisible light within the particular band may be placed on the robot at predetermined locations. Accordingly, the system can use the camera to identify within an image the location of one or more of the invisible fiducial markers on the robot. This information may be used to determine where the robot is relative to the camera. Additionally, the fiducial markers on the robot may be invisible to a human user (e.g., a user that is instructing robot operations) when the robot's operating environment has typical lighting conditions so that the fiducial markers are not visually distracting.

For example, the fiducial markers may be particular patterns applied to the robot with ultraviolet (UV) visible ink that can be detected within a chosen band of ultraviolet light, and the camera may have a filter that passes the chosen band of ultraviolet light. In additional examples, the fiducial markers may be patterns applied to the robot with infrared (IR) visible ink that can be detected within a chosen band of infrared light, and the camera may have a filter that passes the chosen band of infrared light. One possible advantage of infrared is that the system may be less sensitive to bad environment lighting than a system that uses visible fiducial markers.

The fiducial markers may be positioned at one or more different locations on a robot. For instance, one or more fiducial markers on the robot base may be used to determine the (X, Y, Z) position of the base of the robot is relative to the camera. Multiple fiducial markers may be used for redundancy in case other fiducial markers are obscured from view. In some examples, multiple fiducial markers may also be used to determine the full robot pose (e.g., position and orientation) relative to the camera. In further examples, the shapes of the detected fiducial markers within the image may also be used to determine robot position and/or orientation (e.g., a trapezoidal shape may indicate how the fiducial marker is oriented relative to the camera). In additional examples, fiducial markers with unique patterns may be placed on each link of the robot in order to enable the system to locate each robot link relative to the camera. Encoded joint positions received from the robot may be used in conjunction with the detected fiducial markers as well to determine the full joint positioning of the robot.

Within examples, augmented reality may be used to assist a user in instructing robot motion using predefined trajectory points for the robot (also referred to as "teach points" or "waypoints"). For instance, the trajectory points may have been previously programmed by a user as three-dimensional points relative to the base of the robot without knowledge of the robot's current environment. Augmented reality may be preferable to using an entirely virtual 3D model of the robot's environment. If a 3D model of the environment is not accurate, a trajectory may therefore be commanded which unexpectedly causes the robot to collide with an object in the environment or produces other unexpected results.

In order to determine where to project a robot's trajectory points into an image, the position of the robot relative to the camera may be determined. Accordingly, fiducial markers may be placed at known locations on the robot (e.g., on the base and certain joints of the robot). The locations of these fiducial markers within an image of the robot may then be identified and used to determine where the robot is within an environment relative to the camera. Once the position of the robot is determined relative to the camera, positions of one or more waypoints for the robot relative to the camera may also be determined. Based on these positions, the one or more waypoints may be projected into an augmented reality presentation to inform a user where the waypoints will send the robot within its current environment.

Trajectory points and/or other information may be displayed to a user within an augmented reality presentation in various ways. In some examples, full trajectories may overlaid onto the image of the robot's environment (e.g., as paths made up of sequences of connected trajectory points). In additional examples, the display may include a virtual simulation of the robot's movement through a given trajectory or sequence of trajectory points. For instance, a virtual simulation may graphically illustrate how the robot motion will actually look within a particular workcell before the robot is commanded to physically move within the workcell. In another example, one or more collision points may also be displayed which warn the user of possible collisions that may occur if the robot is commanded to move through a given trajectory in a particular workcell. The overlaid virtual annotations may represent other features as well. For instance, instead of showing predetermined trajectory points for the robot, the annotations may instead represent the outer range of reachable locations for the robot based on its current position within a workcell.

In additional examples, virtual annotations may be overlaid for particular links or joints of the robot (e.g., to show in what part of the robot a detected error has occurred). In such examples, fiducial markers may be placed on certain links and/or joints of the robot, and may be used to precisely place virtual annotations for the corresponding robot links and/or joints. By using invisible fiducial markers, many fiducial markers can be placed at different points on the robot to determine precise positioning of the robot without being visually distracting to users.

Referring now to the figures, FIG. 1 shows an example configuration of a robotic system 100. The robotic system 100 may be a robotic arm, a different type of robotic manipulator, or it may have a number of different forms. Additionally, the robotic system 100 may also be referred to as a robotic device, robotic manipulator, or robot, among others.

The robotic system 100 is shown to include processor(s) 102, data storage 104, program instructions 106, controller 108, sensor(s) 110, power source(s) 112, actuator(s) 114, and movable component(s) 116. Note that the robotic system 100 is shown for illustration purposes only as robotic system 100 may include additional components and/or have one or more components removed without departing from the scope of the invention. Further, note that the various components of robotic system 100 may be connected in any manner.

Processor(s) 102 may be a general-purpose processor or a special purpose processor (e.g., digital signal processors, application specific integrated circuits, etc.). The processor(s) 102 can be configured to execute computer-readable program instructions 106 that are stored in the data storage 104 and are executable to provide the functionality of the robotic system 100 described herein. For instance, the program instructions 106 may be executable to provide functionality of controller 108, where the controller 108 may be configured to instruct an actuator 114 to cause movement of one or more movable component(s) 116.

The data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some embodiments, the data storage 104 can be implemented using a single physical device (e.g., one optical, magnetic, organic or other memory or disc storage unit), while in other embodiments, the data storage 104 can be implemented using two or more physical devices. Further, in addition to the computer-readable program instructions 106, the data storage 104 may include additional data such as diagnostic data, among other possibilities.

The robotic system 100 may include one or more sensor(s) 110 such as force sensors, proximity sensors, motion sensors, load sensors, position sensors, touch sensors, depth sensors, ultrasonic range sensors, and infrared sensors, among other possibilities. The sensor(s) 110 may provide sensor data to the processor(s) 102 to allow for appropriate interaction of the robotic system 100 with the environment. Additionally, the sensor data may be used in evaluation of various factors for providing feedback as further discussed below. Further, the robotic system 100 may also include one or more power source(s) 112 configured to supply power to various components of the robotic system 100. Any type of power source may be used such as, for example, a gasoline engine or a battery.

The robotic system 100 may also include one or more actuator(s) 114. An actuator is a mechanism that may be used to introduce mechanical motion. In particular, an actuator may be configured to convert stored energy into movement of one or more components. Various mechanisms may be used to power an actuator. For instance, actuators may be powered by chemicals, compressed air, or electricity, among other possibilities. In some cases, an actuator may be a rotary actuator that may be used in systems involving rotational forms of motion (e.g., a joint in the robotic system 100). In other cases, an actuator may be a linear actuator that may be used in systems involving straight line motion.

In either case, actuator(s) 114 may cause movement of various movable component(s) 116 of the robotic system 100. The moveable component(s) 116 may include appendages such as robotic arms, legs, and/or hands, among others. The moveable component(s) 116 may also include a movable base, wheels, and/or end effectors, among others.

In some implementations, a computing system (not shown) may be coupled to the robotic system 100 and may be configured to receive input from a user, such as via a graphical user interface. This computing system may be incorporated within the robotic system 100 or may be an external computing system that is capable of (wired or wireless) communication with the robotic system 100. As such, the robotic system 100 may receive information and instructions, such as based on user-input at the graphical user interface and/or based on user-input received via press of buttons (or tactile input) on the robotic system 100, among other possibilities.

Figure 2:
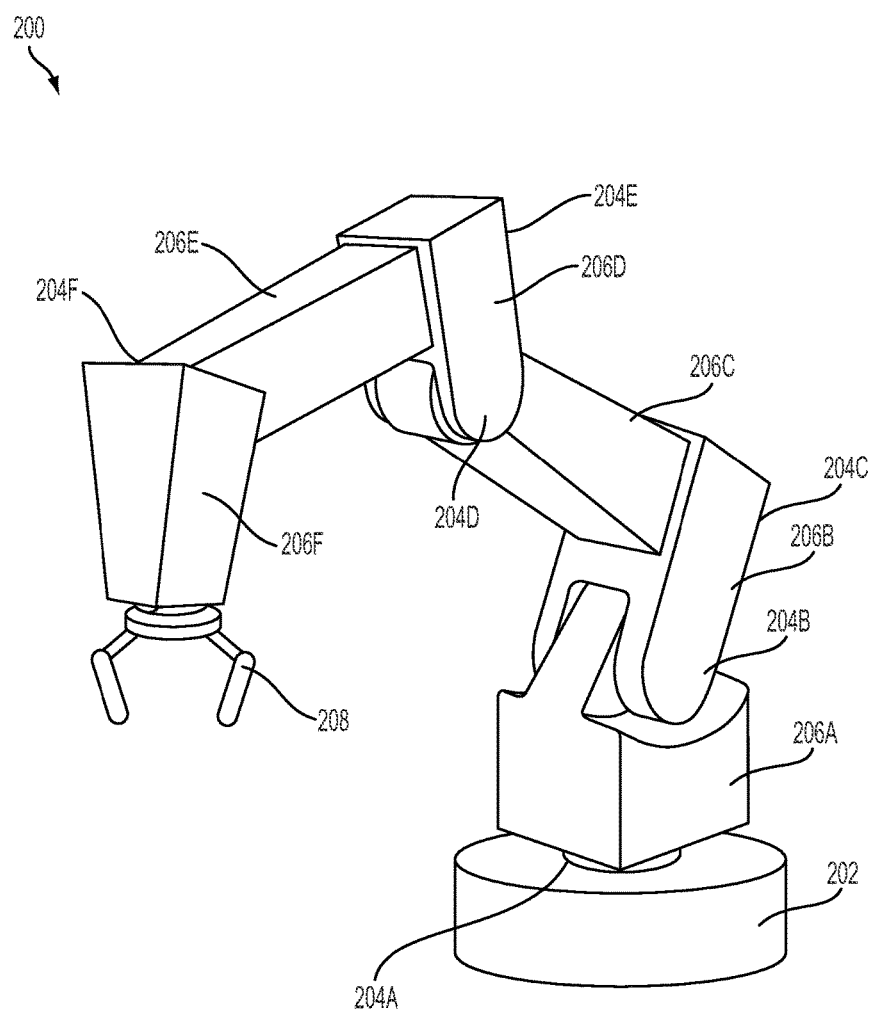
FIG. 2 illustrates an example robotic arm, according to an example embodiment.

A robotic system 100 may take on various forms. To illustrate, FIG. 2 shows an example robotic arm 200. As shown, the robotic arm 200 includes a base 202, which may be a stationary base or may be a movable base. In the case of a movable base, the base 202 may be considered as one of the movable component(s) 116 and may include wheels (not shown), powered by one or more of the actuator(s) 114, which allow for mobility of the entire robotic arm 200.

Additionally, the robotic arm 200 includes joints 204A-204F each coupled to one or more of the actuator(s) 114. The actuators in joints 204A-204F may operate to cause movement of various movable component(s) 116 such as appendages 206A-206F and/or end effector 208. For example, the actuator in joint 204F may cause movement of appendage 206F and end effector 208 (i.e., since end effector 208 is coupled to appendage 206F). Further, end effector 208 may take on various forms and may include various parts. In one example, end effector 208 may take the form of a gripper such as a finger gripper as shown here or a different type of gripper such as a suction gripper. In another example, end effector 208 may take the form of a tool such as a drill or a brush. In yet another example, the end effector may include sensors such as force sensors, location sensors, and/or proximity sensors. Other examples may also be possible.

In an example implementation, a robotic system 100, such as robotic arm 200, may be capable of operating in a teach mode. In particular, teach mode may be an operating mode of the robotic arm 200 that allows a user to physically interact with and guide the robotic arm 200 towards carrying out and recording various movements. In a teaching mode, an external force is applied (e.g., by the user) to the robotic system 100 based on a teaching input that is intended to teach the robotic system regarding how to carry out a specific task. The robotic arm 200 may thus obtain data regarding how to carry out the specific task based on instructions and guidance from the user. Such data may relate to a plurality of configurations of the movable component(s) 116, joint position data, velocity data, acceleration data, torque data, force data, and power data, among other possibilities.

For example, during teach mode the user may grasp onto any part of the robotic arm 200 and provide an external force by physically moving the robotic arm 200. In particular, the user may guide the robotic arm 200 towards grasping onto an object and then moving the object from a first location to a second location. As the user guides the robotic arm 200 during teach mode, the system may obtain and record data related to the movement such that the robotic arm 200 may be configured to independently carry out the task at a future time during independent operation (e.g., when the robotic arm 200 operates independently outside of teach mode). Note, however, that external forces may also be applied by other entities in the physical workspace such as by other objects, machines, and/or robotic systems, among other possibilities.

Figure 3:
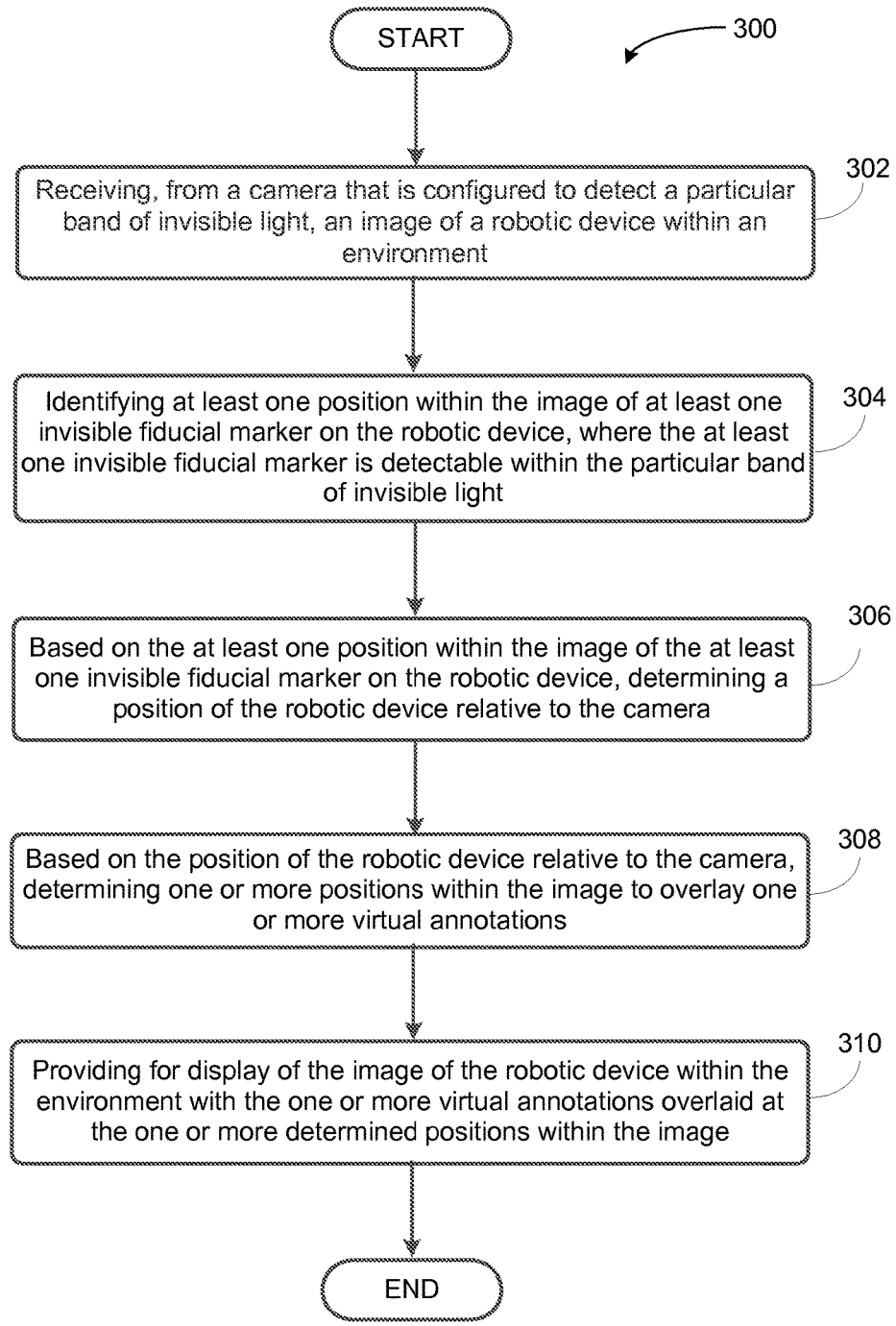
FIG. 3 is a block diagram of an example method, according to an example embodiment.

FIG. 3 illustrates a flowchart showing a method 300 that may allow for display of an augmented reality presentation, according to an example embodiment. Method 300 may be carried out using a display device that includes a camera, such as a tablet device, a smartphone, an HMD, or a laptop computer. In some examples, method 300 may be executed by a local or remote control system of such a device. In further examples, a camera that is separate from the display device may be used. In additional examples, implementation of method 300 may involve a robotic device, such as a robotic device as illustrated and described with respect to FIGS. 1 and 2. Some or all of the steps of method 300 may also be executed by a control system of the robotic device. Other arrangements are also possible.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 3. Where used, program code can be stored on any type of computer-readable medium, for example, such as a storage device including a disk or hard drive.

In addition, each block of the flowchart shown in FIG. 3 may represent circuitry that is wired to perform the specific logical functions in the process. Unless specifically indicated, functions in the flowchart shown in FIG. 3 may be executed out of order from that shown or discussed, including substantially concurrent execution of separately described functions, or even in reverse order in some examples, depending on the functionality involved, so long as the overall functionality of the described method is maintained.

As shown by block 302 of FIG. 3, method 300 involves receiving an image of a robotic device within an environment from a camera. Within example, the image is a two-dimensional (2D) and/or three-dimensional (3D) representation of the robot within the environment. Additionally, the image may be a single still image, a series of still images, and/or a video stream. The robotic device may be the system described and illustrated with respect to FIGS. 1 and 2, or any number of different types of robots. Within examples, the image may include the entire robotic device or some portion of the robotic device. Additionally, the image may be a video stream that includes a changing view of the robotic device. For instance, the camera may be on an HMD, and the user may control the orientation of the HMD to view the robot from different directions.

Within examples, the camera may be designed to detect a particular band of invisible light. More specifically, the camera may include a filter that passes a certain band of invisible light (e.g., ultraviolet light or infrared light) in which one or more invisible fiducial markers on the robot are detectable. The invisible fiducial markers may placed at predetermined locations on the robot that are not visible to humans under normal lighting conditions in the robot's operating environment. However, the invisible fiducial markers may be detectable by the camera in order to allow the system to locate the fiducial markers within an image taken by the camera.

In general, a human user can see wavelengths of light from about 400 nm (violet) to about 700 nm (red). Wavelengths of light below about 400 nm or above about 700 nm are invisible to human users. Below 400 nm is the ultraviolet range and above 700 nm is the infrared range. The camera may be configured to detect a portion of the ultraviolet range or the infrared range. For instance, the camera may be sensitive to a band of invisible light that include certain wavelengths within the ultraviolet range (e.g., between 300 nm and 350 nm) or certain wavelengths within the infrared range (e.g., between 800 nm and 850 nm).

Figure 4A:
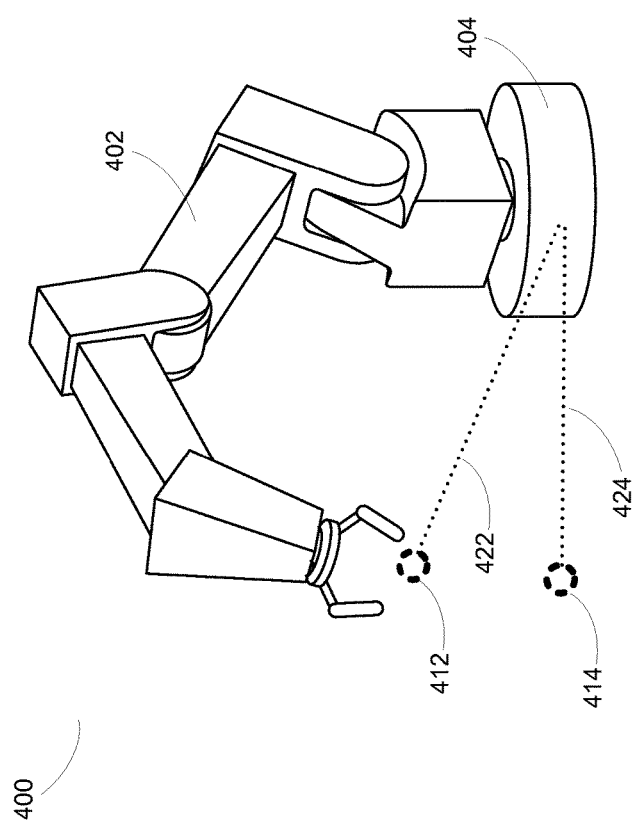
FIGS. 4A, 4B, 4C, and 4D illustrate an example scenario in which trajectory points for a robot are displayed in an augmented reality presentation, according to an example embodiment.

FIG. 4A illustrates trajectory points for an example robotic device, according to an example embodiment. More specifically, trajectory points 412, 414 are shown for a robot 402 which may be imaged as part of an augmented reality presentation. Within examples, a trajectory point is a point relative to the robot that is within a range of motion of the robot. In particular, trajectory points 412, 414 may have (X,Y,Z) coordinates in a frame defined relative to the robot 402, with the origin of the frame located at the base 404 of the robot 402. Trajectory point 412 may have distance 422 from the base 404 of the robot 402, and trajectory point 414 may have distance 424 from the base 404 of the robot 402. Within examples, the robot may be commanded to move through a sequence of trajectory points within a workcell (e.g., by moving its gripper through each of the locations). For instance, robot 402 may be controlled to perform a variety of different possible operations that involve movement between trajectory points, such as for material handling, pick and place, construction, and/or some other type of application. The trajectory points 412, 414 are illustrated with dashed lines in this example to indicate that the points are not visible within the workcell 400.

In some examples, trajectory points may be received from a list of previously determined trajectory points or trajectories, which may have been instructed by a user or by a different third party. The trajectory points may have been determined before the robot was moved to its current workcell. Additionally, the trajectory points may come from several different past trajectories.

Figure 4B:
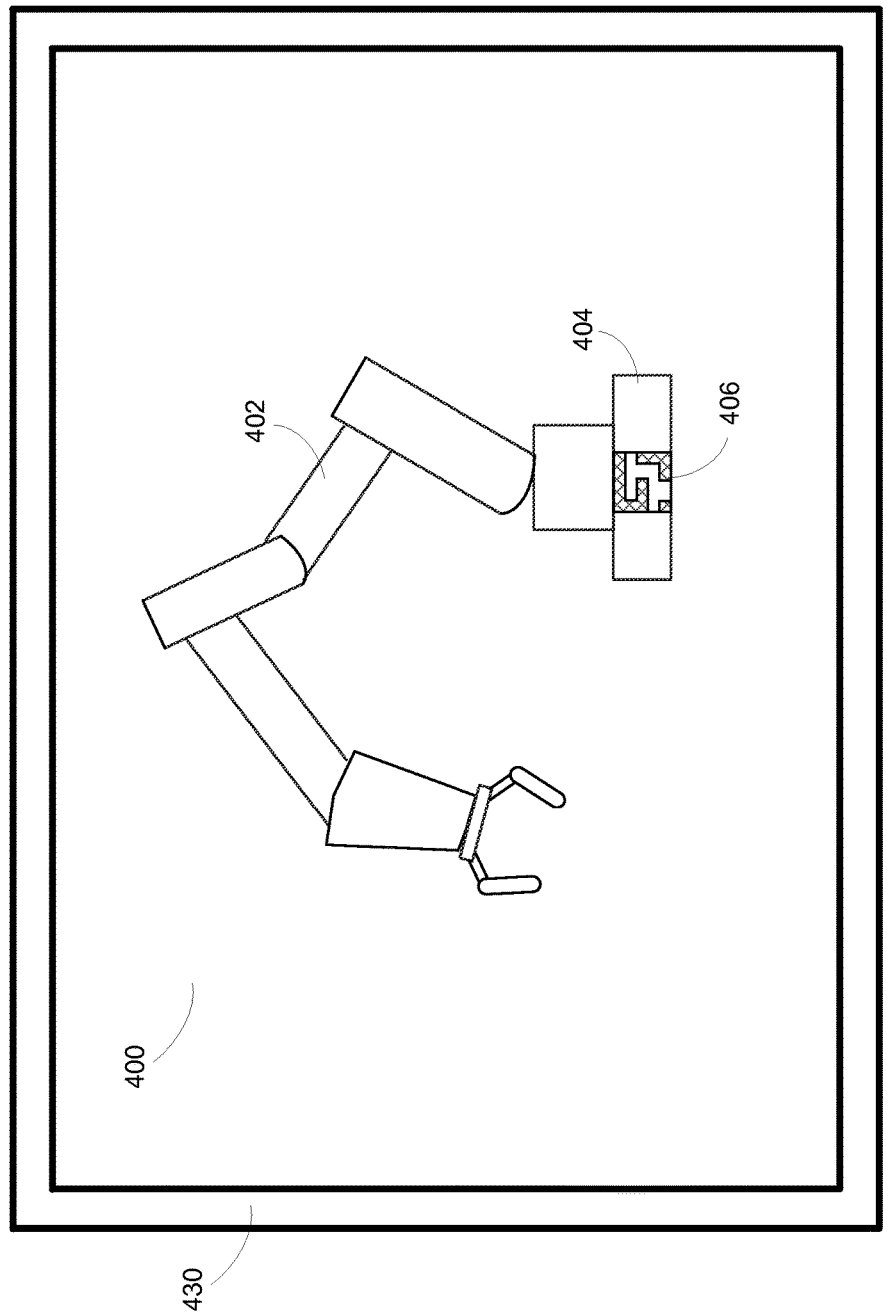

FIG. 4B illustrates an image of the robot from FIG. 4A, according to an example embodiment. Within examples, an image of the robot 402 within environment 400 may be displayed on a display interface 430. In some examples, the display interface 430 may be an interface of a device that also includes the camera which captured the image. For instance, the device may be a tablet computer or an HMD which may be directed at the workcell 400 to show the workcell 400 on display interface 430. In other examples, the display interface 430 may be separate from the camera. For instance, the display interface 430 could be an interface of a laptop or desktop computer. Other types of devices may be used to capture and/or display the image of workcell 400 as well or instead.

As illustrated in FIG. 4B, the image of the workcell 400 may be displayed as a two-dimensional (2D) image. In some examples, the image may be a single still image, or a series of still images that are periodically updated as they are received from the camera. In other examples, the image may be a video stream that is continuously received from the camera for display. As the orientation of the camera changes, the image may be updated to show different portions of the workcell 400 from different points of view. In further examples, the image may also be displayed as a three-dimensional (3D) image.

Referring back to FIG. 3, method 300 further involves identifying at least one position within the image of at least invisible fiducial marker on the robotic device, as shown by block 304. More specifically, an invisible fiducial marker is a pattern placed at a predetermined position on the robot that is not visible to a human user under typical lighting conditions of the robot's operating environment. Additionally, the invisible fiducial markers may be detectable within a certain band of invisible light that is viewable by the camera.

Within examples, various types or combinations of patterns and/or shapes may be used for fiducial markers, including crosses, boxes, dots, two-dimensional barcodes, hex patterns, and/or circular patterns. In additional examples, the fiducial markers may be ARTags that also provide orientation information based on keystoning. Other types of fiducials may be used as well or instead.

In reference to FIG. 4B, an invisible fiducial marker 406, may be detected by the camera. More specifically, robot 402 operating within operating environment 400 may be provided with a fiducial marker 406 on a base 404 of the robot 402. The fiducial marker 406 may be invisible to humans under typical lighting conditions of the robot's environment. Additionally, the fiducial marker 406 may have a particular identifying pattern made of a substance (e.g., UV-visible ink) that is detectable by a camera that is configured to detect a particular band of invisible light. The fiducial marker 406 may be detected by the camera to determine the position of robot 402 with greater precision than using image processing directly on an image of the robot.

In some examples, the invisible fiducial marker 406 may reflect light with a wavelength that the camera can detect. For instance, the invisible fiducial marker 406 could reflect a broad band of infrared or ultraviolet light outside of the visible spectrum. As a specific example, the invisible fiducial marker 406 may be composed of infrared-visible ink or an infrared-reflecting material that reflects light with a wavelength above 800 nm. In such an example, either ambient infrared light or one or more infrared LED's on the camera could be used to stimulate the infrared-reflecting material to detect the invisible fiducial marker 406.

In further example, the invisible fiducial marker may reflect and/or emit a narrow band of infrared light. For instance, the invisible fiducial marker 406 may be made of infrared-visible ink that reflects infrared light at 850 nm, and the camera may include a filter that passes infrared light between 825 nm and 875 nm in order to enable the camera to detect the invisible fiducial marker 406. In further examples, the infrared-visible ink may be stimulated to reflect infrared light by lighting within the robot's operating environment. In some examples, light may be directed toward the invisible fiducial marker 406 (e.g., by the camera) in order to stimulate the invisible fiducial marker 406. For instance, this light could be visible light or infrared light with a different wavelength that is filtered out by the camera's filter.

In further examples, the invisible fiducial marker 406 may be detected by the camera by looking at where the invisible fiducial marker 406 absorbs light. For instance, the invisible fiducial marker 406 may be made of infrared-visible ink that reflects infrared light at 850 nm and absorbs infrared light at 800 nm. The camera may be filtered so that it can see the absorbed light, but not the reflected light. For instance, the camera may include a filter that allows infrared light between 775 nm and 825 nm to pass through. The ink making up invisible fiducial marker 406 may then be detectable as dark areas where the ink absorbs the infrared light.

In additional examples, ultraviolet-visible ink may be used for the invisible fiducial marker 406, and the camera may include a filter that passes certain wavelengths of ultraviolet light.

In further examples, the invisible fiducial marker 406 may include a light source instead of or in addition to ink. For instance, infrared light-emitting diodes (LED's) may be placed on the robot behind a diffuser shaped in a particular identifiable pattern. The pattern may then be detected by a camera that can see infrared light in order to help determine the robot's position relative to the camera. In some examples, a single LED with a diffuser may provide a relatively inexpensive means of generating an invisible detectable pattern.

In additional examples, heat may be used to emit infrared light detectable by a camera with a filter that passes infrared light. For instance, an invisible fiducial marker may be fabricated in the copper traces of a printed circuit board (PCB) with current passed through it to warm the copper (e.g., on the surface of the robotic device or just below the surface). The arrangement of the copper traces on the PCB may therefore produce a particular detectable infrared pattern on a robot that may be used as a fiducial marker.

In yet further examples, a robotic device may include a shell or skin that is made of or includes a window of plastic that is transparent to infrared light and opaque to visible light. One or more invisible fiducial markers may then be hidden from users behind the IR-transparent plastic window. For instance, an IR-emitting source (e.g., an infrared LED with a diffuser) or an IR-reflecting pattern could be placed inside a robot's shell behind the window.

Referring back to FIG. 3, method 300 further involves determining a position of the robotic device relative to the camera, as shown by block 306. More specifically, the position of one or more of the invisible fiducial markers on the robot within the image may be used to determine where the robot is located within the environment relative to the camera. In some examples, determining the position of the robot may include determining a full pose of the robot (including orientation) relative to the camera.

Once a fiducial marker is identified within a 2D image, the size and/or shape of the fiducial marker within the image may be used to estimate the distance of the fiducial marker from the camera (e.g., because an object that is further away will appear smaller when projected into the 2D image). The size and/or shape of the fiducial marker within the image may therefore be used to estimate how far away the robot is from the camera. The system may have prior knowledge of the positioning of the fiducial marker on the robot (e.g., on the robot base). In other examples, the fiducial marker may include a code indicating where it is located on the robot. The position of the fiducial marker within the image may therefore be used to determine a position of the robot within the environment relative to the camera.

In reference to FIG. 4B, the size and shape of invisible fiducial marker 406, as well as the position of invisible fiducial marker 406 within the image may be used to determine the location of the robot 402 relative to the camera. More specifically, because the fiducial marker 406 is positioned on a base 404 of the robot 402, the fiducial marker 406 may be used to determine where the robot base 404 is relative to the camera. In further examples, a full transformation between a frame of the camera and a frame at the base 404 of the robot 402 may be determined. In particular, the shape of the fiducial marker 406 may indicate an amount of rotation between the camera and the robot base 404. As described in more detail, multiple fiducial markers on the robot may be identified and used to more precisely determine the position and/or pose of the robot relative to the camera as well.

Referring back to FIG. 3, method 300 further involves determining one or more positions within the image to overlay one or more virtual annotations, as shown by block 308. More specifically, once the position of the robot relative to the camera is determined, the robot may be used as a reference point to determine where to virtually overlay annotations as part of an augmented reality presentation. Within examples, a virtual annotation is a piece of data or information graphically overlaid on an image of the robot. For instance, a virtual annotation may include text, color, shapes, and/or other graphical constructs that communicate information related to the robot. The position of the robot relative to the camera may be used to determine where to overlay particular virtual annotations in a display interface.

For example, the virtual annotations may correspond to virtual trajectory points for the robot. The virtual trajectory points may be positioned in the image to show where certain predetermined trajectory points will cause the robot to move within its current workcell. Once the position of the robot (e.g., the robot base) relative to the camera is determined, positions of trajectory points for the robot relative to the camera may also be determined. The trajectory points may then be projected into the image and displayed graphically as virtual annotations representing virtual trajectory points.

Figure 4C:
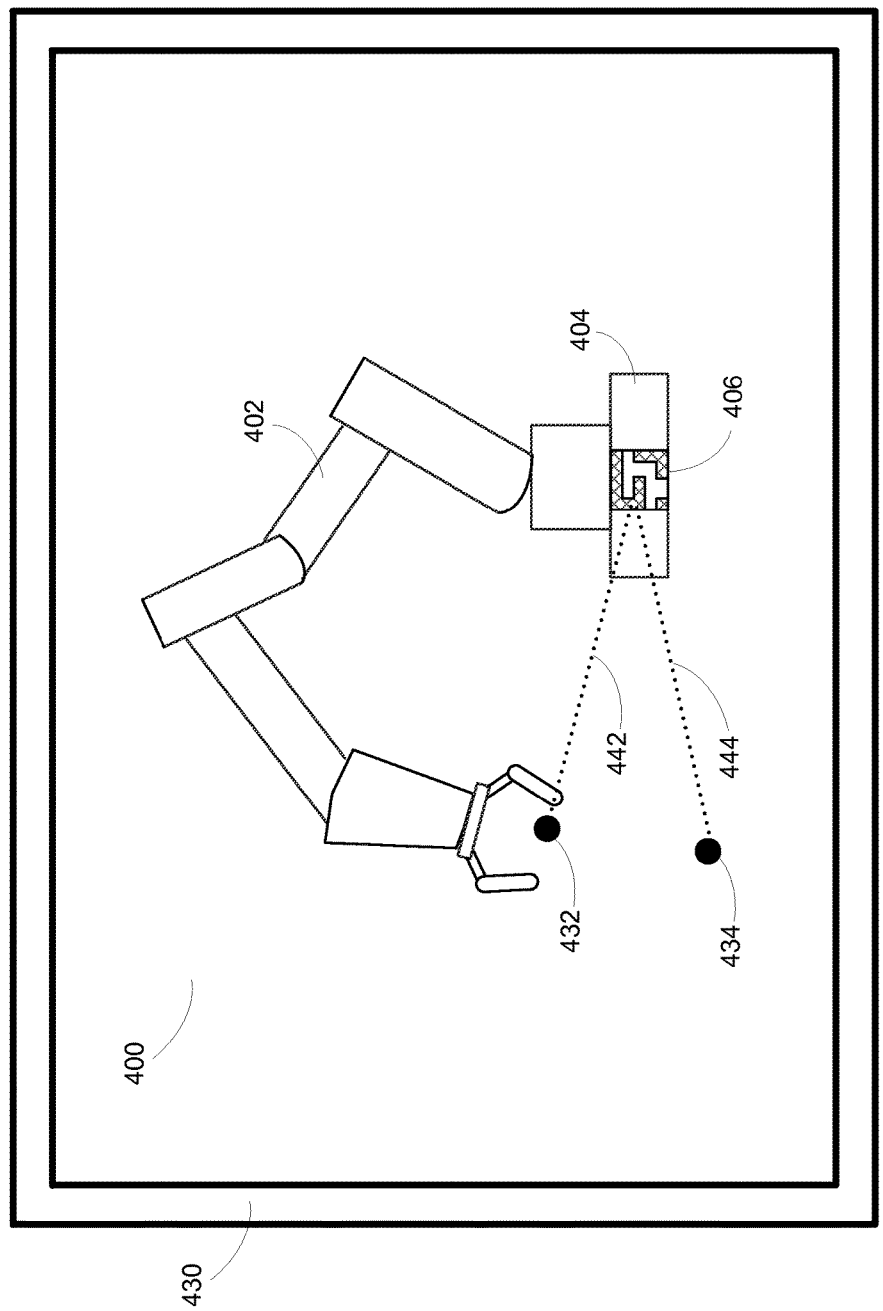

FIG. 4C illustrates placement of virtual annotations for a robotic device, according to an example embodiment. More specifically, once the fiducial marker 406 is located within the image, the position of fiducial marker 406 may be used to determine the position of virtual trajectory points 432, 434 for the robot 402. Virtual trajectory points 432, 434 correspond to the trajectory points 412, 414 illustrated in FIG. 4A. In some examples, the trajectory points 412, 414 may be referenced directly with fiducial marker 406 and/or with the base 404 of the robot 402. The trajectory points 412, 414 may then be projected into the 2D image as virtual trajectory points 432, 434. In the resulting projection, virtual trajectory point 432 may have a distance 442 from the fiducial marker 406 and virtual trajectory point 434 may a distance 444 from the fiducial marker 406.

In further examples, virtual annotations may be placed relative to other parts of a robot besides the base as illustrated in FIG. 4C. For instance, virtual annotations may correspond to particular links of the robot, and may be positioned relative to the corresponding links within the image instead.

Referring back to FIG. 3, method 300 further involves providing for display of the image of the robot with overlaid virtual annotations, as shown by block 310. More specifically, an augmented reality presentation may be displayed showing an actual image of the robot's environment (e.g., a live video stream) along with virtual annotations graphically overlaid that provide additional information. For instance, the virtual annotations may be virtual trajectory points that show where particular trajectory points will cause the robot to move within an image of the environment. Such a presentation may be used by a user to preview where trajectory points will cause the robot to move before the user selects trajectory points and issues instructions to the robot to move to the selected trajectory points.

As described in more detail below, virtual annotations may be graphically displayed in a variety of ways. For instance, virtual trajectory points could be displayed as individual points, sequences of connected points, or even as a virtual simulation of the robot moving through the points. Additionally, the augmented reality presentation may be displayed on a device such as an HMD or tablet device that includes a camera which captures an image of the environment, or the presentation may be displayed on a separate computing device such as a laptop computer.

Figure 4D:
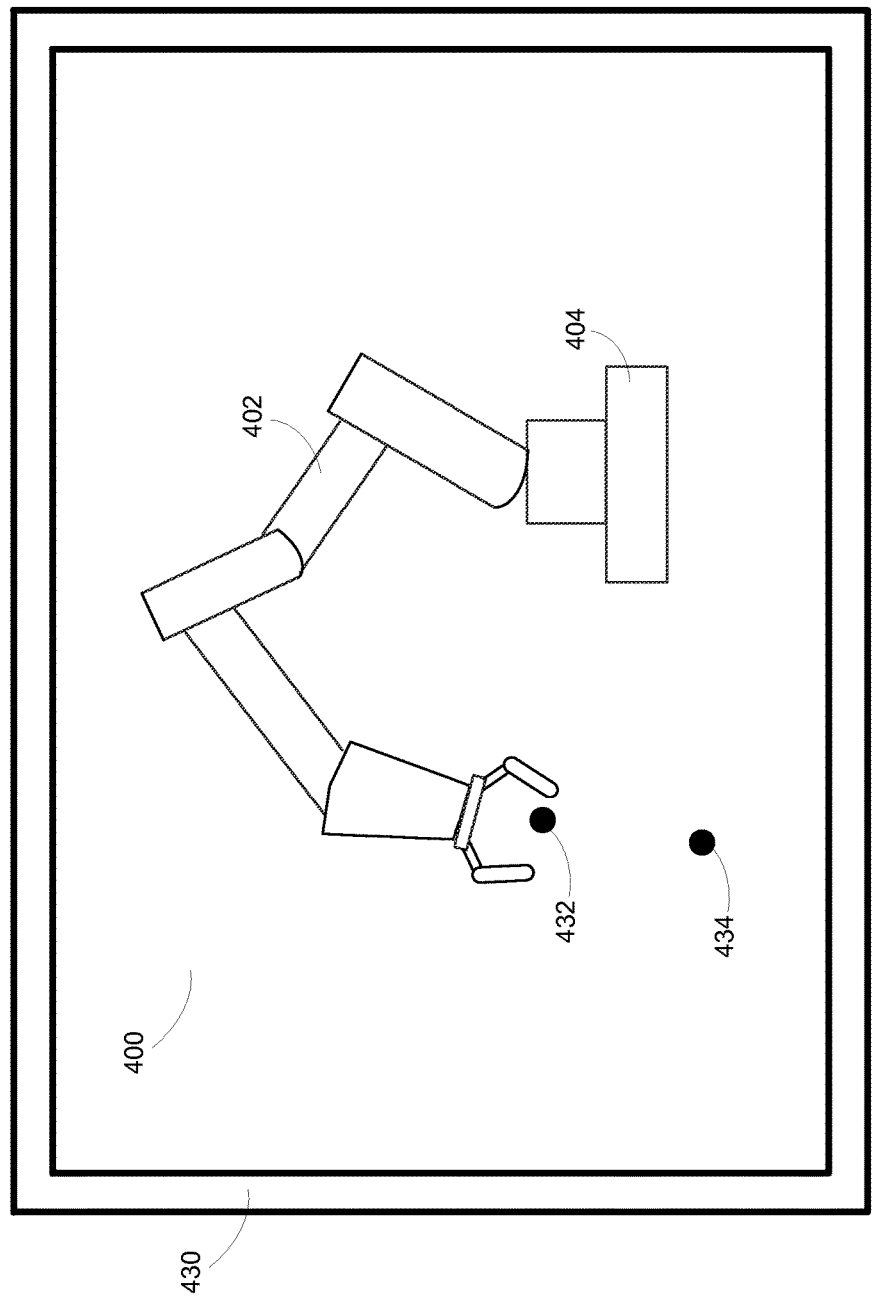

FIG. 4D illustrates an image of a robot's environment with overlaid virtual trajectory points, according to an example embodiment. More specifically, the display interface 430 may show an image of the workcell 400 of robot 402 along with virtual trajectory points 432 and 434 graphically overlaid onto the displayed image. The positions of the virtual trajectory points 432 and 434 shown overlaid on the image may change as the camera orientation changes (e.g., as a user wearing an HMD looks around the robot's environment). In some examples, the invisible fiducial markers on the robot may be visible within the image. For instance, if the camera has a filter that passes visible light as well as a particular band of infrared light, then invisible fiducial markers (e.g., fiducial markers made of infrared-visible ink) which can be seen by the camera may also appear in an augmented reality presentation.

In further examples, a filter may be chosen for the camera that passes a targeted narrow band of invisible light chosen to avoid creating an excessive amount of distortion in the displayed image while still being sufficient to allow for accurate detection of fiducial markers on the robot. In further examples, post-processing may be performed on the image after detection of the fiducial markers in order to reduce or remove the appearance of the fiducial markers within the image. For instance, pixels corresponding to a fiducial marker may be replaced with the color of surrounding pixels on the robot body before providing the image for display.

In other examples, the camera may cycle between taking visible images and images that include a certain band of invisible light. For instance, the fiducial markers may be visible within a particular band of infrared light, and a filter may periodically be applied to the camera to allow the camera to see the particular band of infrared light. At other times, all infrared light may be filtered out. Images captured when the infrared filter is applied may be used to locate the fiducial markers on the robot. Visible images captured when all infrared light is filtered out which do not show the fiducial markers may be displayed for the augmented reality presentation.

In further examples, two separate cameras may be used, one camera that detects visible light and a second camera that detects invisible light within a particular band that allows for detection of the fiducial markers on the robot. The position and/or pose of the first camera relative to the second camera may be predetermined. The second camera may then be used to locate the invisible fiducial markers on the robot while visible images from the first camera may be displayed to the user for the augmented reality presentation. The offset between the two cameras may be accounted for using a simple transformation to determine where the invisible fiducial markers detected by the second camera are located relative to the first camera. The invisible fiducial markers may then be used to place virtual annotations in proper positions over the visible image of the robot from the first camera.

Figure 5A:
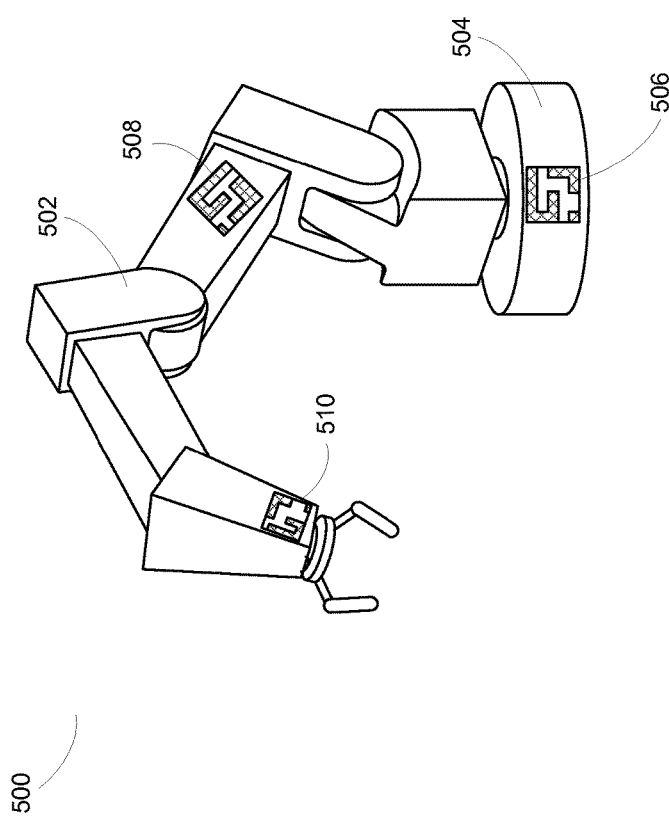
FIGS. 5A and 5B illustrate a robotic device with multiple fiducial markers, according to an example embodiment.

FIG. 5A illustrates a robotic device with multiple fiducial markers, according to an example embodiment. More specifically, fiducial marker 506 may be placed on the base 504 of robot 502, and additional fiducial markers 508, 510 may be placed on separate links of robot 502. The fiducial markers 506, 508, 510 are shown here for purposes of illustration, but may be invisible fiducial markers that are not visible by a human user within environment 500 under normal lighting conditions. Within examples, multiple fiducial markers may provide redundancy benefits and/or improved precision in placing virtual annotations as part of an augmented reality presentation.

Figure 5B:
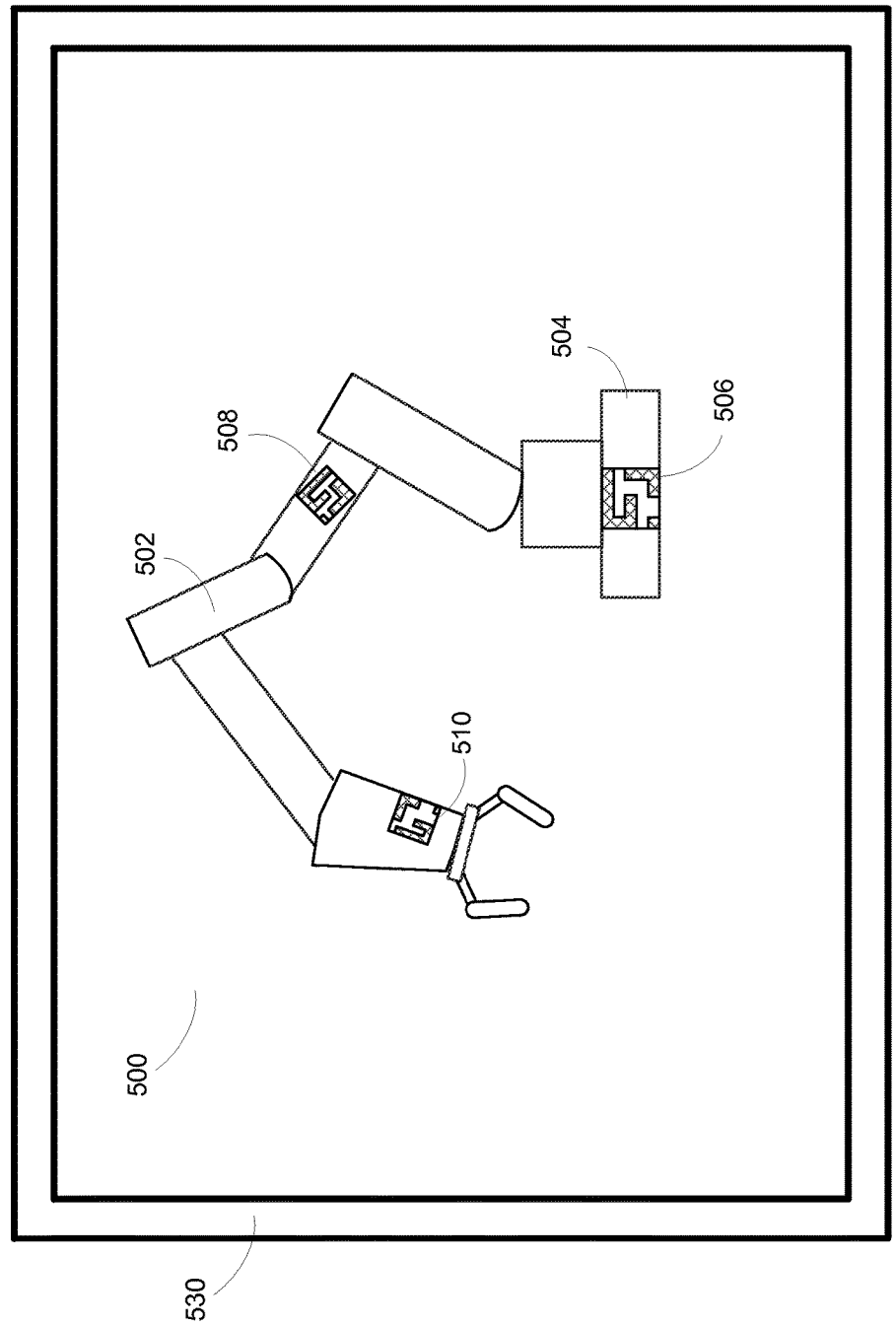

FIG. 5B illustrates an image of the robot from FIG. 5A, according to an example embodiment. More specifically, a camera may include a filter that passes certain wavelengths of invisible light so that the camera may detect invisible fiducial markers 506, 508, 510 on robot 502. The camera may also display a visual image of the robot 502 within environment 500 on display interface 530 as part of an augmented reality presentation. The size, shape, and position of the invisible fiducial markers 506, 508, 510 within the image may be used to determine locations to place one or more virtual annotations within the image.

In some examples, the system may localize the robot 502 relative to the camera in both (X,Y,Z) position and out-of-plane rotations. The positions of separate fiducial markers on the robot may help to determine the full pose of the robot 502. In particular, the angle from the camera between separate fiducial markers may be determined and used to determine how the robot 502 is oriented relative to the camera. Within examples, it may be advantageous to have fiducial markers on the robot 502 separated by a relative large distance in order to improve the accuracy of determining this angle. Accordingly, in one example embodiment, a first fiducial marker 506 may be placed on the base 504 of the robot 502 and a separate fiducial marker 510 may be placed on an arm or wrist of the robot 510.

In further examples, the shapes of fiducial markers 506, 508, and/or 510 may be determined and used to help determine the full pose of the robot 502 relative to the camera as well or instead. In particular, a trapezoidal shape of a particular fiducial marker (e.g., an ARTag) may be used to determine how the camera is oriented relative to the particular fiducial marker.

In some examples, a device which includes the camera may be in communication with a control system of the robot. The control system of the robot may provide information about the current joint positioning of the robot. For instance, encoded joint angles may be received from the control system. Once the position and orientation of the robot relative to the camera is determined (e.g., the position and orientation of the robot base), the encoded joint angles may be used to determine the position and orientation of individual robot joints or links relative to the camera as well. Virtual annotations may then be overlaid relative to the individual robot joints or links instead of using the base of the robot as a reference point.

In further examples, separate fiducial markers may be placed on several different robot joints or links. For instance, in one example embodiment, two invisible fiducial markers may be placed on each robot link. The position of individual robot links may then be determined relative to the camera even when other fiducial markers (e.g., on the robot base) are not within the camera's field of view. The invisible fiducial markers on each link may have distinguishable patterns in order to allow the system to identify positions of particular robot links within an image. Virtual annotations may then be overlaid relative to the identified robot links. Invisible fiducial markers may be particularly advantageous when placing a large number of fiducial markers on a robot because many visible fiducial markers may be visually distracting to a user.

Within examples, an augmented reality presentation may include a number of different types of virtual annotations. For example, a virtually overlaid representation of trajectory points may be displayed in a variety of different manners. FIGS. 6A, 6B, 6C, and 6D illustrate several possible types of example presentations.

Figure 6A:
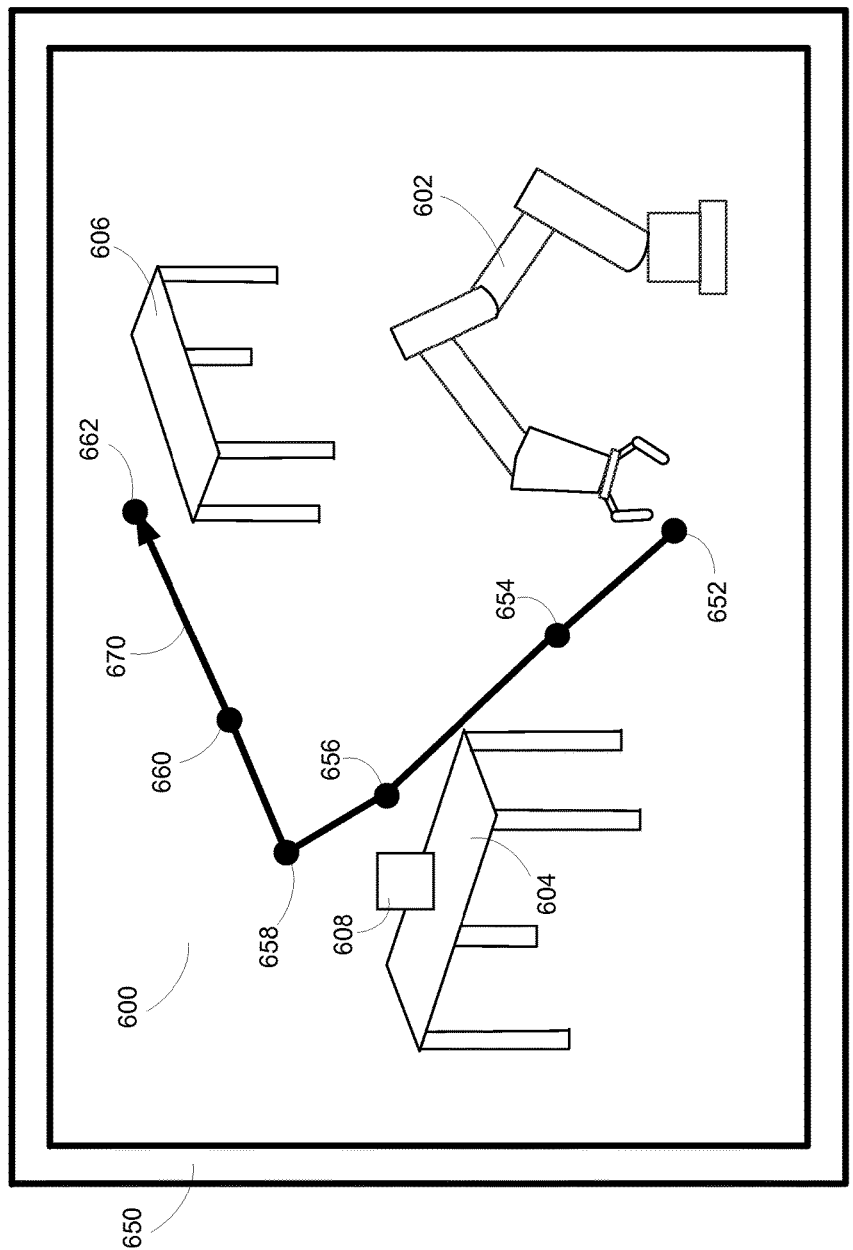
FIGS. 6A, 6B, 6C, and 6D illustrate additional example augmented reality presentations, according to example embodiments.

FIG. 6A illustrates an image of robot's environment with an overlaid virtual trajectory, according to an example embodiment. More specifically, a robot 602 may operate within a workcell 600 that includes table 604, table 606, and box 608. A display interface 650 may show an image of the workcell 600. Virtual trajectory points 652, 654, 656, 658, 660, and 662 may be overlaid on the image in accordance with the methods previously described. Additionally, virtual trajectory 670 connecting virtual trajectory points 652-662 may also be displayed on the image of workcell 600.

Within examples, a virtual trajectory may be a graphical representation of a sequence of connected trajectory points. The ordering of trajectory points within the trajectory may be determined based on prior information about the trajectory points. For instance, the robot 602 may have previously been commanded to move through the trajectory points 652-662 in the order shown by virtual trajectory 670. In another example, only virtual trajectory 670 may be visually displayed on display interface 650 without specifically highlighting individual trajectory points.

In further examples, a user interface associated with display interface 650 may receive input data indicating one or more changes to a virtual trajectory for the robot. For instance, display interface 650 may include a touch-based interface aligned with the image. The user interface may allow a user to select different virtual trajectory points for virtual trajectory 670 and/or change the ordering of virtual trajectory points. In some examples, the robot 602 may also be commanded to move through a trajectory in workcell 600 that corresponds to virtual trajectory 670 and/or to individual trajectory points via the user interface as well.

In additional examples, individual trajectory points may also be modified via a user interface as well. For instance, a user may be able to select and drag a particular virtual trajectory point (e.g., virtual trajectory point 656) to change the position of the virtual trajectory point in the image. An output signal may then be provided to indicate a changed position of the corresponding trajectory point for the robot, where the change is determined by projecting the change in position of the virtual trajectory point back out into physical space. In this manner, pre-existing trajectory points may be adjusted by a user based on the current configuration of the workcell (e.g., to cause the robot to move around a new obstacle).

Figure 6B:
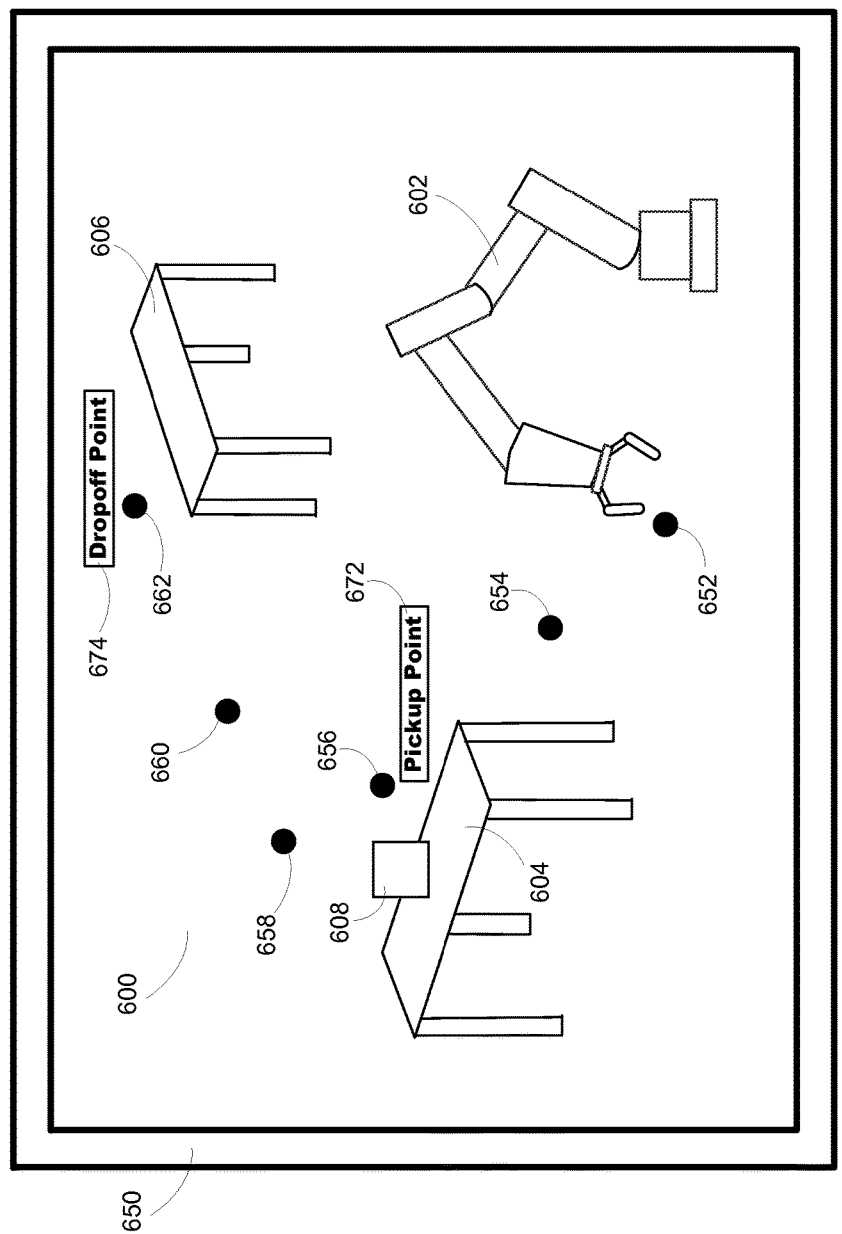

FIG. 6B illustrates an image of a robot's environment with overlaid semantic labels, according to an example embodiment. More specifically, trajectory points for a robot may be received from a list that includes certain semantic labels for corresponding points. For instance, the semantic labels may indicate operations performed by the robot at particular points in a trajectory. As illustrated in FIG. 6B, label 672 may indicate that virtual trajectory point 656 corresponds to a point where the robot 602 picks up an object such as box 608. Additionally, label 674 may indicate that virtual trajectory point 662 corresponds to a point where the robot 602 drops the object. The semantic labels may be overlaid on the image in addition to or instead of another representation of the virtual trajectory points. In some examples, the labels may help to remind a user why a robot has been commanded to move to a particular trajectory point in the past.

Figure 6C:
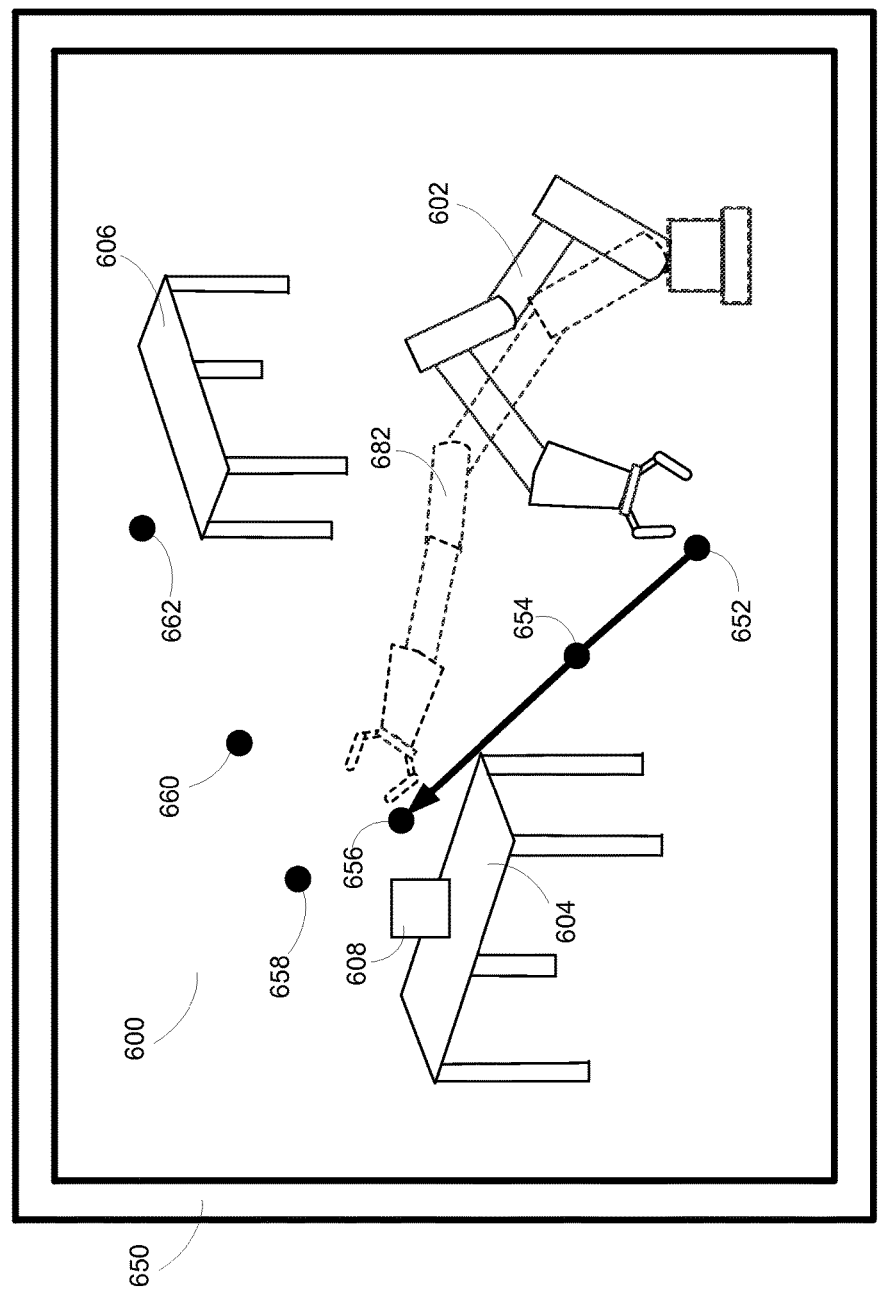

FIG. 6C illustrates an image of a robot's environment with an overlaid virtual simulation of robot movement, according to an example embodiment. More specifically, a sequence of robot movements may be illustrated graphically to show how the robot's motion through particular trajectory points will appear from the point of view of the camera. As illustrated in FIG. 6C, the robot 602 may be illustrated as virtual robot 682 showing the position of the robot 602 as it crosses virtual trajectory point 656. In a further example, a sequence of virtual robot positions may show the robot 602 moving through each of trajectory points 652-662. A virtual simulation may be helpful to provide a user with a more intuitive notion of how particular virtual trajectory points will cause a robot to move within its current environment.

Figure 6D:
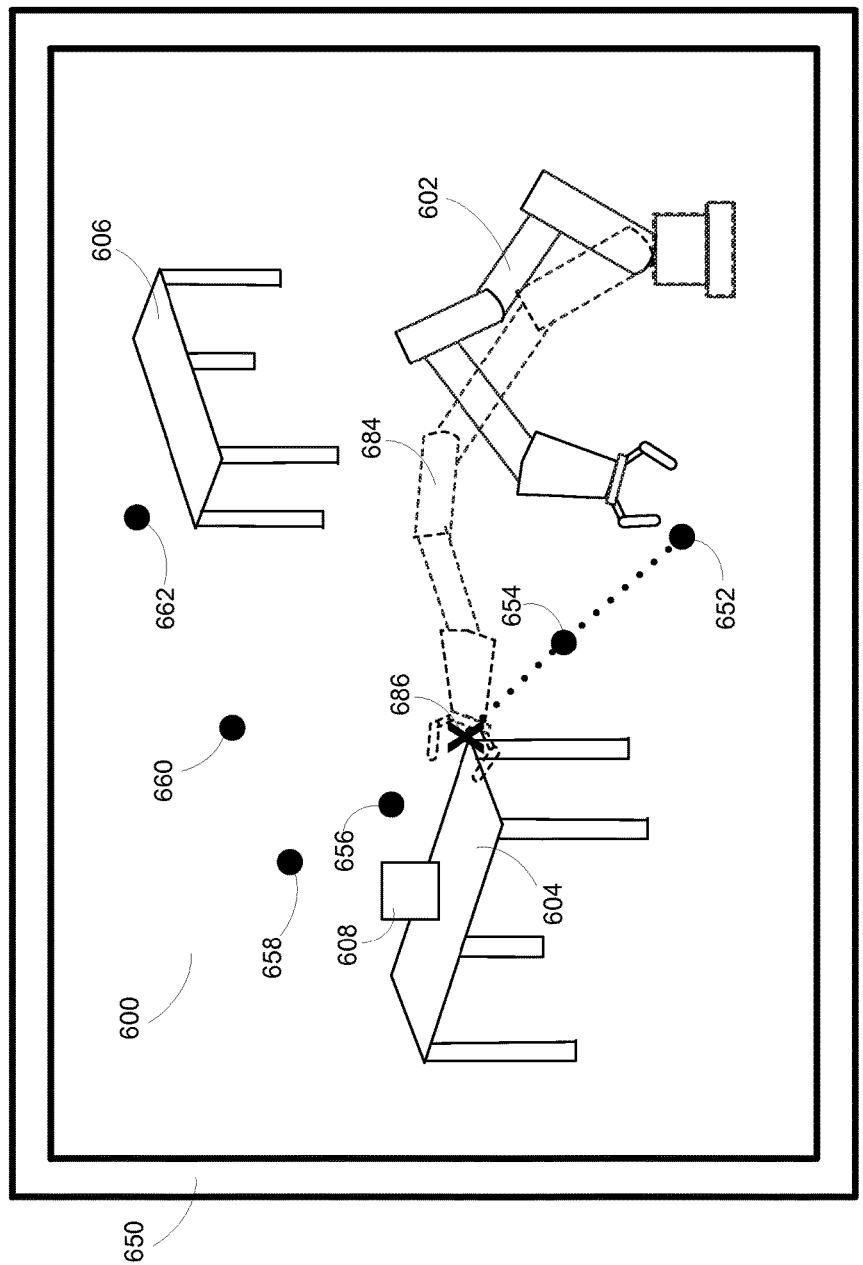

FIG. 6D illustrates an image of a robot's environment with an overlaid virtual collision point, according to an example embodiment. More specifically, the system may determine that a trajectory or sequence of trajectory points may cause a collision between the robot and one or more obstacles in the robot's environment. The potential collision point may be displayed within augmented reality to show a user where the potential collision may occur. For instance, as shown in FIG. 6D, a trajectory that causes robot 602 to move from a trajectory point that corresponds to virtual trajectory point 654 to a trajectory point that corresponds to virtual trajectory point 656 may cause the robot 602 to collide with table 604 at a collision point 686. Both a virtual annotation (e.g., an "X") showing collision point 686 as well as a projected position 684 of the robot 602 at the potential collision may be overlaid on the image to inform a user about the potential collision if the robot is commanded to move through the particular trajectory points.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information, such as a block of a method described above, may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

I claim:
1. A system, comprising:
a robotic device;
a plurality of invisible fiducial markers positioned on a corresponding plurality of links of the robotic device, wherein the plurality of invisible fiducial markers are detectable within a particular band of invisible light;

a camera that is configured to detect the particular band of invisible light; and a control system configured to:
receive, from the camera, an image of the robotic device within an environment;
identify respective positions within the image of the plurality of invisible fiducial marker on the robotic device;
based on the the respective positions within the image of the plurality of invisible fiducial markers on the robotic device, determine respective positions of the corresponding plurality of links of the robotic device relative to the camera;
based on the respective positions of the corresponding plurality of links of the robotic device relative to the camera, determine one or more positions within the image to overlay one or more virtual annotations; and
provide for display of the image of the robotic device within the environment with the one or more virtual annotations overlaid at the one or more determined positions within the image.

2. The system of claim 1, wherein the plurality of invisible fiducial markers are made up of ink visible within a particular band of ultraviolet light, and
wherein the camera is configured to detect the particular band of ultraviolet light.

3. The system of claim 1, wherein the plurality of invisible fiducial markers are made up of ink visible within a particular band of infrared light, and
wherein the camera is configured to detect the particular band of infrared light.

4. The system of claim 1, wherein the one or more virtual annotations comprise one or more virtual trajectory points that correspond to one or more trajectory points for the robotic device.

5. The system of claim 4, further comprising an invisible fiducial marker is positioned on a base of the robotic device, and wherein the control system is further configured to:
receive one or more positions of the one or more trajectory points for the robotic device relative to the base of the robotic device;
based on a position within the image of the invisible fiducial marker on the base of the robotic device, determine a position of the base of the robotic device relative to the camera; and
determine the one or more positions within the image to overlay the one or more virtual trajectory points based on the received one or more positions of the one or more trajectory points relative to the base of the robotic device and further based on the position of the base of the robotic device relative to the camera.

6. The system of claim 1, wherein the control system is further configured to:
based on the plurality of positions within the image of the plurality of invisible fiducial markers on the robotic device, determine a pose of the robotic device relative to the camera; and
based on the pose of the robotic device relative to the camera, determine the one or more positions within the image to overlay the one or more virtual annotations.

7. The system of claim 6, wherein the plurality of invisible fiducial markers comprise a first invisible fiducial marker positioned on a base of the robotic device and a second invisible fiducial marker positioned on an arm of the robotic device, wherein the control system is further configured to:

determine an angle from the camera between the first invisible fiducial marker and the second invisible fiducial marker; and
determine the pose of the robotic device relative to the camera based at least in part on the determined angle.

8. The system of claim 6, wherein the control system is further configured to:
determine a plurality of shapes within the image of the plurality of invisible fiducial markers on the robotic device; and
determine the pose of the robotic device relative to the camera based at least in part on the determined plurality of shapes within the image of the plurality of invisible fiducial markers on the robotic device.

9. The system of claim 1, wherein the control system is further configured to:
receive encoded joint angles of a plurality of joints of the robotic device that connect a plurality of links of the robotic device;
based on the position of the robotic device relative to the camera and further based on the encoded joint angles of the plurality of joints of the robotic device, determine respective positions of the plurality of links of the robotic device relative to the camera; and
based on the respective positions of the plurality of links of the robotic device relative to the camera, determine the one or more positions within the image to overlay the one or more virtual annotations.

10. A method, comprising:
receiving, from a camera that is configured to detect a particular band of invisible light, an image of a robotic device within an environment;
identifying at least one position within the image of at least one invisible fiducial marker on the robotic device, wherein the at least one invisible fiducial marker is detectable within the particular band of invisible light;
based on the at least one position within the image of the at least one invisible fiducial marker on the robotic device, determining a position of the robotic device relative to the camera;
based on the position of the robotic device relative to the camera, determining one or more positions within the image to overlay one or more virtual annotations, wherein the one or more virtual annotations comprise one or more virtual trajectory points that correspond to one or more trajectory points for the robotic device; and
providing for display of the image of the robotic device within the environment with the one or more virtual annotations overlaid at the one or more determined positions within the image.

11. The method of claim 10, wherein the at least one invisible fiducial marker is positioned on a base of the robotic device, the method further comprising:
receiving one or more positions of the one or more trajectory points for the robotic device relative to the base of the robotic device;
based on the at least one position within the image of the at least one invisible fiducial marker on the base of the robotic device, determining a position of the base of the robotic device relative to the camera; and
determining the one or more positions within the image to overlay the one or more virtual trajectory points based on the received one or more positions of the one or more trajectory points relative to the base of the robotic device and further based on the position of the base of the robotic device relative to the camera.

12. The method of claim 10, wherein the at least one invisible fiducial marker comprises a plurality of invisible fiducial markers, the method further comprising:
- identifying a plurality of positions within the image of the plurality of invisible fiducial markers on the robotic device;
- based on the plurality of positions within the image of the plurality of invisible fiducial markers on the robotic device, determining a pose of the robotic device relative to the camera; and
- based on the pose of the robotic device relative to the camera, determining the one or more positions within the image to overlay the one or more virtual annotations.

13. The method of claim 10, wherein the at least one invisible fiducial marker comprises a plurality of invisible fiducial markers positioned on a corresponding plurality of links of the robotic device, the method further comprising:
- identifying respective positions within the image of the plurality of invisible fiducial markers;
- based on the respective positions within the image of the plurality of invisible fiducial markers, determining respective positions of the corresponding plurality of links of the robotic device relative to the camera; and
- based on the respective positions of the corresponding plurality of links of the robotic device relative to the camera, determining the one or more positions within the image to overlay the one or more virtual annotations.

14. A non-transitory computer-readable medium having stored therein instructions, that when executed by a computing system, cause the computing system to perform functions comprising:
- receiving, from a camera that is configured to detect a particular band of invisible light, an image of a robotic device within an environment;
- identifying at least one position within the image of at least one invisible fiducial marker on the robotic device, wherein the at least one invisible fiducial marker is detectable within the particular band of invisible light;
- based on the at least one position within the image of the at least one invisible fiducial marker on the robotic device, determining a position of the robotic device relative to the camera;
- receiving encoded joint angles of a plurality of joints of the robotic device that connect a plurality of links of the robotic device;
- based on the position of the robotic device relative to the camera and further based on the encoded joint angles of the plurality of joints of the robotic device, determining respective positions of the plurality of links of the robotic device relative to the camera;
- based on the position of the robotic device relative to the camera and the respective positions of the plurality of links of the robotic device relative to the camera, determining one or more positions within the image to overlay one or more virtual annotations; and
- providing for display of the image of the robotic device within the environment with the one or more virtual annotations overlaid at the one or more determined positions within the image.

15. The non-transitory computer-readable medium of claim 14, wherein the one or more virtual annotations comprise one or more virtual trajectory points that correspond to one or more trajectory points for the robotic device.

16. The non-transitory computer-readable medium of claim 15, wherein the at least one invisible fiducial marker is positioned on a base of the robotic device, the functions further comprising:
- receiving one or more positions of the one or more trajectory points for the robotic device relative to the base of the robotic device;
- based on the at least one position within the image of the at least one invisible fiducial marker on the base of the robotic device, determining a position of the base of the robotic device relative to the camera; and
- determining the one or more positions within the image to overlay the one or more virtual trajectory points based on the received one or more positions of the one or more trajectory points relative to the base of the robotic device and further based on the position of the base of the robotic device relative to the camera.

17. The non-transitory computer-readable medium of claim 14, wherein the at least one invisible fiducial marker comprises a plurality of invisible fiducial markers, the functions further comprising:
- identifying a plurality of positions within the image of the plurality of invisible fiducial markers on the robotic device;
- based on the plurality of positions within the image of the plurality of invisible fiducial markers on the robotic device, determining a pose of the robotic device relative to the camera; and
- based on the pose of the robotic device relative to the camera, determining the one or more positions within the image to overlay the one or more virtual annotations.

* * * * *